(12) United States Patent
Hinterberger et al.

(10) Patent No.: US 12,308,473 B2
(45) Date of Patent: May 20, 2025

(54) SWITCHING CONFIGURATION FOR A BATTERY MODULE

(71) Applicant: AUDI AG, Ingolstadt (DE)

(72) Inventors: Michael Hinterberger, Großmehring (DE); Julia Stöttner, Ingolstadt (DE); Christoph Terbrack, Ingolstadt (DE); Christian Endisch, Geisenfeld (DE)

(73) Assignee: AUDI AG, Ingolstadt (DE)

( * ) Notice: Subject to any disclaimer, the term of this patent is extended or adjusted under 35 U.S.C. 154(b) by 1149 days.

(21) Appl. No.: 17/097,509

(22) Filed: Nov. 13, 2020

(65) Prior Publication Data

US 2021/0151727 A1    May 20, 2021

(30) Foreign Application Priority Data

Nov. 14, 2019  (DE) .......................... 102019130739.2

(51) Int. Cl.
*H01M 50/502*  (2021.01)
*H01M 10/42*   (2006.01)

(52) U.S. Cl.
CPC ....... *H01M 50/502* (2021.01); *H01M 10/425* (2013.01); *H01M 2010/4271* (2013.01); *H01M 2220/20* (2013.01)

(58) Field of Classification Search
CPC .......................... H01M 50/502; H01M 10/425
See application file for complete search history.

(56) References Cited

U.S. PATENT DOCUMENTS 9,825,549 B2    11/2017  Choi et al.
2012/0119582 A1*  5/2012  Tajima ............... H02J 7/0024
                                                         307/71
2018/0219478 A1*  8/2018  Götz ..................... B60L 53/22

FOREIGN PATENT DOCUMENTS

| CN | 1462107 A   | 12/2003 |
| CN | 102640336 A | 8/2012  |
| CN | 103151947 A | 6/2013  |
| CN | 107852092 A | 3/2018  |
| CN | 107947256 A | 4/2018  |
| CN | 108674246 A | 10/2018 |

(Continued)

OTHER PUBLICATIONS

German Search Report issued on Oct. 20, 2020 in corresponding German Application No. 102019130739.2; 12 pages; Machine translation attached.

(Continued)

*Primary Examiner* — Maria Laios
*Assistant Examiner* — Jordan E Berresford
(74) *Attorney, Agent, or Firm* — Maier & Maier, PLLC

(57) ABSTRACT

A cell having a galvanic cell. The galvanic cell has a first and a second electrode connection. The first electrode connection is connected to a first cell connection and the second electrode connection is connected to a second cell connection. The battery cell has a third and a fourth cell connection and at least four semiconductor switching elements, by which the electrode connections, depending on a respective switching state of the semiconductor switching elements, can each be electrically coupled to the third or the fourth of the cell connections. These are primarily used to remove and add individual battery cells from or to the system and/or to connect cells in parallel, independently of the (activation or deactivation) state of the preceding and following cells.

7 Claims, 10 Drawing Sheets

(56) References Cited

FOREIGN PATENT DOCUMENTS

| CN | 109895654 A | 6/2019 | |
|---|---|---|---|
| CN | 107852092 B * | 7/2020 | ............. B60L 53/22 |
| DE | 102010041059 A1 | 3/2012 | |
| DE | 102015112512 A1 | 2/2017 | |
| DE | 102016106359 A1 | 10/2017 | |
| WO | 2014/072488 A2 | 5/2014 | |

OTHER PUBLICATIONS

Office Action issued on Nov. 30, 2023, in corresponding Chinese Application No. 202011284259.5, 14 pages.

* cited by examiner ly known in the prior art. Batteries of the generic
SWITCHING CONFIGURATION FOR A BATTERY MODULE

FIELD

According to a first aspect, the invention relates to a battery cell having a galvanic cell, a first semiconductor switching element, a first cell connection which is directly electrically coupled to a first potential connection of the galvanic cell, and a second cell connection which is electrically coupled to a second potential connection of the galvanic cell via the first semiconductor switching element. According to the first aspect, the invention furthermore relates to a battery having a plurality of battery cells, at least two battery terminals, and a control unit, wherein a predetermined number of the battery cells are connected in series and the series circuit is connected at a first end to a first of the at least two battery terminals and at a second end to a second of the at least two battery terminals. According to the first aspect, the invention furthermore relates to a method for providing a predeterminable electrical voltage by means of a battery, wherein the battery comprises at least a predetermined number of battery cells connected in series, wherein each of the battery cells of the series circuit comprises a galvanic cell, a first semiconductor switching element, a first cell connection, which is electrically coupled directly to a first potential connection of the galvanic cell, and a second cell connection, which is electrically coupled via the first semiconductor switching element to a second electrical potential connection of the galvanic cell.

According to a second aspect, however, the invention also relates to a battery cell having a galvanic cell, wherein the galvanic cell comprises a first and a second electrode connection, wherein the first electrode connection is connected to a first cell connection and the second electrode connection is connected to a second cell connection. Furthermore, according to the second aspect, the invention relates to a battery module having at least one battery cell. Moreover, according to the second aspect, the invention relates to a battery having a plurality of battery modules arranged adjacent to one another and each having at least two module connections, wherein each battery module comprises at least one battery cell. Finally, the invention also relates to a motor vehicle having a vehicle electrical system which comprises an electrical machine as the drive device and a battery.

BACKGROUND

Battery cells, batteries having battery cells, methods for their operation, and motor vehicles of the generic type are extensively known in the prior art. Batteries of the generic type are used, in addition to stationary applications, for example in uninterruptible power supplies, electrical power supplies in isolated operation, and/or the like, also in motor vehicles, in particular in electrically driven motor vehicles, such as electric vehicles, hybrid vehicles, or the like.

The battery of the generic type is generally used to reversibly store electrical energy. Such a battery is also referred to as an accumulator. For the purpose of reversible energy storage, the battery generally comprises a plurality of battery cells, which each comprise a galvanic cell that is able to store the electrical energy chemically. For this purpose, the galvanic cell generally has two electrodes which form the respective potential connections of the galvanic cell. The electrodes are electrochemically connected to one another, for example via an electrolyte that interacts with the electrodes. An electrical DC voltage then occurs at the electrodes, which essentially results due to the electrochemistry. The DC voltage that occurs between the electrodes of a single galvanic cell is usually a few volts, depending on the cell chemistry, for example approximately 1.2 V to approximately 4.5 V.

Batteries of the generic type are often supposed to provide high DC voltages, for example, in electrically driven motor vehicles, a DC voltage in a range of several hundred volts, preferably approximately 400 V or more, in particular approximately 800 V. As a result, for a battery to implement such DC voltages, a large number of battery cells have to be electrically connected in series. Depending on the energy or power requirement, a parallel circuit of battery cells can additionally be necessary.

In the prior art, it is common, particularly in electrically drivable motor vehicles, to couple the battery to an electric machine as the drive device via an energy converter, often formed by an inverter or a DC-DC converter. This proves to be complex. In addition, it should be noted that two-point or three-point inverters are usually used as inverters. As a result, the question of electromagnetic compatibility is very relevant in the energy conversion and in addition a harmonic component can be large in an AC voltage provided by the inverter. The same considerations also basically apply to DC-DC converters.

A method for setting a target output voltage of a power supply branch of a controllable energy storage unit is known from DE 10 2010 041 059 A1. In this teaching, an energy storage unit is provided which comprises a plurality of energy storage modules connected in series, which in turn each comprise a plurality of energy storage cells connected in series. Each of the energy storage modules has two switching elements, wherein the energy storage cells are connected in series to one of the switching elements and this series circuit is connected in parallel to the second switching element. As a result, a respective energy storage module can be activated or deactivated by switching the switching elements appropriately. By appropriately switching the switching elements, it is supposed to be possible to provide an AC voltage at a respective end of such a series circuit, specifically in the manner of a multilevel energy converter (multilevel converter), also referred to as MMC, M2C, MMI, M2I, or the like. As a result, the inverter according to the teaching of DE 10 2010 041 059 A1 is supposed to be able to be saved.

Multilevel energy converters and methods for their operation are also extensively known in the prior art, so that separate documentary evidence is not required for this purpose. This also applies to converter modules of such a multilevel energy converter, which are used to construct the multilevel energy converter. multilevel energy converters are a special type of clocked energy converters. Such multilevel energy converters are preferably used bidirectionally, so that electrical energy can be converted from an AC voltage side to a DC voltage side and also vice versa. The conversion usually takes place without a significant change in the voltage level, that is to say that the level of a maximum amplitude of the AC voltage essentially corresponds to half a level of an intermediate circuit DC voltage of a DC voltage intermediate circuit to which the multilevel energy converter is connected. This fact is disadvantageous in the prior art topology of the MMC, since a separate number of cells is necessary to generate voltages of different polarity (positive and negative), i.e. to generate a sinusoidal output voltage, for example, with a predetermined amount of battery cells, respectively one half is required for the positive half sine wave and the other half is required for the negative half sine wave. This means that output voltages can only be generated having an amplitude value that corresponds to half of the maximum battery output voltage.

The multilevel energy converter generally has a series circuit made up of a plurality of converter modules, which in turn comprise a converter module capacitor and—connected in parallel thereto—a series circuit made up of two semiconductor switches connected in series. The converter module capacitor not only needs to be formed by a capacitor, but it can also have one or more battery cells and/or electrical energy sources. Due to the circuit structure, the control of the converter modules is relatively operationally-reliable compared to alternative circuit concepts, in particular with respect to a two-point inverter, which is why the multilevel energy converter is particularly suitable for applications with high electrical voltages. In addition, the multilevel energy converter does not need an intermediate circuit capacitor on the intermediate circuit side, which, moreover, turns out to be very complex and expensive with a high electrical voltage. Corresponding support for the DC voltage intermediate circuit is achieved by the converter module capacitors.

For multilevel energy converters, interconnection options are known that range from so-called flying capacitor converters and neutral-point clamped (NPC) multilevel energy converters to cascaded H-Bridge (CHB) multilevel energy converters. The latter are particularly characterized by their scalability, because the output voltage may be generated by connecting individual modules in series. The modules or converter modules usually have an H-bridge circuit of semiconductor switches and the converter module capacitor. Alternatively, a battery or a battery module can also be provided in addition to the converter module capacitor. Depending on the circuit structure, any number of phases and thus any n-phase AC voltage can be generated.

In addition to the CHB variant, there is also the option of cascading half-bridge modules, which only have two semiconductor switches connected in series and the associated converter module capacitor or battery cell. Although the number of semiconductor switches can be reduced, for example by approximately half, which in turn can also reduce power loss in normal operation, this circuit structure proves to be disadvantageous in that only unipolarity can be achieved with regard to the AC voltage. The teaching of DE 10 2010 041 059 A1 is also based on this problem. In addition, WO 2014/072488 A2 discloses a converter having converter cells connected in series. In the event of a defect, the converter cells can be short-circuited by means of a bypass switch.

SUMMARY

The invention has set itself the object of refining a battery cell of the generic type, a battery, a method for providing a predeterminable electrical voltage by means of a battery, and a motor vehicle in such a way that the battery is used for the direct supply of an energy supply network, in particular an electrical machine to which AC voltage is to be applied, wherein the complexity is reduced compared to the prior art.

As a solution, the invention proposes a battery cell, a battery module, a battery, a method for providing a predeterminable electrical voltage by means of a battery, and a motor vehicle.

With regard to a generic battery cell, according to a first aspect, it is proposed in particular that it has a third cell connection which is electrically coupled to the second potential connection of the galvanic cell, a second semiconductor switching element, and a fourth cell connection which is electrically coupled to the first potential connection of the galvanic cell via the second semiconductor switching element.

With regard to a generic battery, the first aspect of the invention proposes in particular that the battery cells are designed according to the invention, wherein to implement the series circuit, in each case a first cell connection of a respective first one of the battery cells is electrically connected to a second cell connection of a respective second one of the battery cells and in each case a third cell connection of the respective first of the battery cells is electrically connected to a fourth cell connection of the respective second one of the battery cells, and the control unit is at least connected to first and second semiconductor switching elements of the respective battery cells in order to operate the semiconductor switching elements in dependence on a predeterminable electrical voltage at the respective battery terminals.

With regard to a generic method, the first aspect of the invention proposes in particular that each battery cell of the series circuit comprises a third cell connection electrically coupled to a second potential connection of the galvanic cell, a second semiconductor switching element, and a fourth cell connection which is electrically coupled via the second semiconductor switching element to the first potential connection of the galvanic cell, wherein to implement the series circuit, in each case a first cell connection of a respective first one of the battery cells is electrically connected to a second cell connection of a respective second one of the battery cells and in each case a third cell connection of the respective first of the battery cells is electrically connected to a fourth cell connection of the respective second one of the battery cells, wherein the semiconductor switching elements of the battery cells are activated in dependence on an electrical voltage predetermined for the series circuit in order to provide the predetermined electrical voltage at the ends of the series circuit.

With regard to a generic battery cell, a second aspect proposes in particular that it has a third and a fourth cell connection and at least four semiconductor switching elements, by means of which the electrode connections can be electrically coupled to the third or fourth cell connection in dependence on a respective switching state of the semiconductor switching elements.

With regard to a generic battery module, the second aspect proposes in particular that the battery module has at least one battery cell according to the invention and four module connections for electrically coupling module connections of further battery modules and/or of battery terminals of a battery comprising the battery module.

With regard to a generic battery, the second aspect proposes in particular that the battery modules are at least partially designed according to the invention. With regard to a generic method, the second aspect proposes in particular that the battery modules each have four module connections, namely a first, a second, a third and a fourth module connection, wherein at least a part of the battery modules has at least one battery cell having a circuit structure, in which a galvanic cell has a first and a second electrode connection, wherein the first electrode connection is connected to a first cell connection and the second electrode connection is connected to a second cell connection, and wherein the battery cell has a third and a fourth cell connection and at least four semiconductor switching elements, by means of which the electrode connections can be electrically coupled to the third or fourth of the cell connection depending on a respective switching state of the semiconductor switching elements, wherein the semiconductor switching elements of the battery cells are activated in dependence on the electrical voltage predetermined for the battery in order to provide the predetermined electrical voltage at the battery terminals.

With regard to a motor vehicle of the generic type, it is proposed in particular that the battery is designed according to the invention and the electrical machine is connected directly to the battery.

The invention is based, inter alia, on the concept that by way of a special structure of the circuit of each of the battery cells, a modular design of the battery can be achieved with little effort, so that the battery is capable of providing nearly any electrical voltage at the battery terminals or at the ends of the respective series circuit by way of suitable control by the control unit. The setting of the electrical voltage can be varied over time as needed so that, for example, predeterminable AC voltages can also be provided. This makes it possible to provide an AC voltage in the manner of a multilevel energy converter using the battery of the invention. The circuit structure permits an electrical voltage to be provided in a highly flexible manner, in particular dynamically, by means of the battery. The battery cells of the battery can be used at least partially like converter modules of a multilevel energy converter. However, not all battery cells need to be used to provide a predetermined electrical voltage. In particular, it can be provided that only some of the battery cells of the battery are connected in series in order to provide the predetermined electrical voltage. Some of the battery cells can also be used as a reserve or to provide a further predeterminable electrical voltage. For example, unused battery cells can also be connected in parallel to battery cells that are already active in order to improve a current carrying capacity or the like. The battery cell can also be formed by a comparable energy source that can absorb and/or output electrical energy. However, the invention is not solely limited to the provision of AC voltages. It can also be provided that a DC voltage, a pulsating DC voltage, or the like can be provided, depending on the predetermined electrical voltage. Multiple predetermined electrical voltages can also be provided, for example three AC voltages offset in terms of their phase position in order to be able to provide a three-phase AC voltage.

The invention is therefore also suitable, for example, for providing an energy supply network which uses an AC voltage. In addition, the invention can of course also be used to provide one or more adjustable DC voltages, for example if the electrical machine of the motor vehicle is a DC voltage machine, the power of which can be adjusted in dependence on the respective presently set electrical DC voltage.

The invention is based on a novel circuit structure of the respective battery cells, in which—in contrast to the prior art—each of the battery cells has four cell connections. The specific circuit structure of each of the battery cells makes it possible not only to activate or deactivate the respective battery cell with a series circuit of the battery cells according to the invention, but also to be able to set the polarity of its galvanic cell as required. For example, it is possible not only to bridge individual cells in the series circuit of battery cells in order to achieve a lower present voltage value than that which the total voltage of all battery cells connected in series can provide, but in addition polarities of galvanic cells can also be inverted, for example to reduce the provided electrical voltage or even to be able to provide negative electrical voltages at the battery terminals. Although each battery cell has only two semiconductor switching elements, this function is possible.

Because the invention is able to provide this functionality with only two semiconductor switching elements for a respective one of the battery cells, losses that can occur during normal operation can of course also be reduced accordingly. This makes the invention particularly suitable for integration in a battery. In addition, it is to be considered that the switching elements of each of the battery cells only need to be designed for the generally low DC voltage of the respective galvanic cell and no longer for the high voltage values at the output of the battery or the entire battery, approximately 400 V to approximately 800 V. As a result, not only can inexpensive switching elements be used, but it is also possible to use switching elements that have particularly low transmission losses. As a result, an additional reduction of losses can be achieved in normal operation.

Due to the special circuit structure of the galvanic cells, which—in contrast to the prior art—have four cell connections, it is thus possible to implement the desired functionality of the battery cells using only two semiconductor switching elements. The first semiconductor switching element thus makes it possible to activate the galvanic cell between the first and the second cell connection, so that a corresponding DC voltage can be provided at the first and the second cell connection. If, on the other hand, the semiconductor switching element is in the switched-off switching state, no DC voltage is provided by the battery cell between the first and the second cell connection. In this operating state, the battery cell can be bridged by the switched-on switching state of the second semiconductor switching element. The further functionality with regard to the polarity reversal of the galvanic cell can be achieved in cooperation with the further battery cells in the series circuit, namely the battery cells that are directly connected to the respective battery cell. The galvanic cell can, for example, be connected between the first and the third cell connection. In addition, it is also possible for the galvanic cell to be connected between the second and the fourth cell connection. The semiconductor switching elements are then to be provided accordingly.

To connect the battery cells in the series circuit, it can therefore be provided in particular that, in the case of two battery cells to be electrically connected to one another, the first cell connection of the first battery cell is electrically connected to the second cell connection of the second battery cell and the third cell connection of the first battery cell is electrically connected to the fourth cell connection of the second battery cell. This connection also applies to the other battery cells that are to be connected to one another in the series circuit. Due to the structure of a series circuit provided in this way and the functionality implementable due to the circuit structure by actuating the semiconductor switching elements, the galvanic cell of a respective one of the battery cells can not only be activated or deactivated, but it can also be inverted in terms of polarity, specifically with respect to providing the respective DC voltage. The first semiconductor switching element, in conjunction with the first and the second cell connection and the galvanic cell, provides the functionality that is known in the prior art. The additional functionality according to the invention is thus implemented by the second semiconductor switching element in conjunction with the third and the fourth cell connection.

The invention therefore makes it possible, not only, but especially in electrically drivable motor vehicles, to be able to directly couple the electrical machine provided as a drive device with a high degree of efficiency to the battery, in order to achieve the desired power supply in normal operation of the motor vehicle.

As with a multilevel energy converter, the battery according to the invention can thus be used to provide a stepped electrical voltage which can approximate a sine wave, for example, in its shape. In contrast to conventional two-point or three-point inverters, in which only two or three different electrical potentials are available, respectively, a significantly larger number of different potential levels or voltage levels can be implemented in the invention by means of the large number of galvanic cells. The number of voltage levels or the corresponding voltage that results from the combination of the voltage levels are of course dependent on how many battery cells are available in the series circuit and which electrical voltage the respective galvanic cells provide. As a rule, the galvanic cells are designed in the same way, so that they provide essentially the same electrical voltage. As a result, a significantly more accurate simulation of a desired voltage curve can be implemented, in particular if it is variable over time, for example in the case of a sine wave. Electrical voltages generated in this way, in particular AC voltages, have significantly lower distortion values in comparison to AC voltages generated using conventional inverters and, moreover, are preferably more reliable. This has an effect in particular on electromagnetic compatibility, in particular with respect to radio interference such as strand-bound radio interference or the like.

The invention thus uses an innovative smart cell topology which can be optimized for the functionality of a multilevel energy converter. As a result, both a positive and a negative electrical voltage can be provided with minimal losses of the semiconductor switching elements provided.

In order to generate a negative electrical voltage, the semiconductor switching elements located between the individual galvanic cells of the battery cell can be switched on, wherein the respective complementary semiconductor switching elements are switched on to represent a positive electrical voltage. Depending on the desired voltage value of the electrical voltage to be provided, some, in particular successive, battery cells can also be bridged with the aid of the additional semiconductor switching elements, so that the functionality of the multilevel energy converter can be implemented.

Due to the reduced number of semiconductor switching elements in comparison to the prior art, in particular with respect to a circuit structure of converter modules according to CHB, the number of semiconductor switching elements located in a load path can be reduced, approximately by half. Independently of the polarity and the dimension of the electrical voltage to be provided by the battery, there is always only a single one of the semiconductor switching elements in the current-carrying path or in the switched-on switching state for each battery cell.

Because of the battery cell according to the invention according to the two aspects, a highly flexible circuit structure or circuit topology is also achievable for the battery, which allows a simple adaptation option to specific applications by activating or deactivating battery cells as required. It is thus possible to design the battery for the provision of a higher maximum electrical voltage by adding battery cells or, conversely, by removing battery cells, to ensure the provision of lower electrical voltages, depending on the required output voltage. It is also possible to connect further series circuits in parallel, for example to be able to provide a multiphase AC voltage. The number of phases of the AC voltage to be provided can depend on a respective specific application.

Using the battery of the invention it is possible to be able to provide electrical voltages, in particular electrical voltages variable over time, of almost any curve shape, for example a sinusoidal curve shape, a triangular curve shape, a sawtooth curve shape, and/or the like. In addition, with a multiphase AC voltage, it is possible to set phase shifts of individual phase voltages with respect to one another as well as the voltage amplitudes of the phase voltages individually and in a highly flexible manner.

Furthermore, depending on the predetermined electrical voltage, depending on a specific application, it can be provided that the electrical voltage to be provided can also have a DC offset. For this purpose, the semiconductor switching elements only need to be activated in such a way that the number of resulting positive and negative voltage levels differs.

The circuit topology or circuit structure according to the invention allows only a fraction of battery cells to be added, for example by way of a further partial series circuit or the like, in addition to the simple expansion within a single phase strand or a single series circuit. In this case, the additional battery cells do not need to correspond to the battery cells of the series circuit, but can nonetheless be included in the battery independently of this.

Multiple series circuits can of course also be connected in parallel. However, it is particularly advantageous if not only one phase is implemented by a series circuit but, for example—depending on an electrical current load or required electrical capacitance—multiple series circuits can also be associated with a respective phase.

It has proven to be particularly advantageous if a respective battery cell is not required to provide the predetermined electrical voltage or is defective and can be deactivated entirely in a simple manner in that it can be bridged by means of the semiconductor switching elements present. This can take place independently of the activation or deactivation state of the preceding and following cells.

Any number of cells can also be bridged, also independent of the activation or deactivation status of the preceding and following cells. One advantage of the invention, however, lies primarily in the possibility of being able to connect the battery cells that are to be bridged and are not actually required in parallel during operation.

The switching element can be formed by one or more semiconductor switching elements. In addition, the switching element can also comprise an electromechanical switching element, for example a relay, a contactor, and/or the like. Basically, the semiconductor switching element can also be formed by an electromechanical switching element or any other suitable switching element.

The switching element, in particular the semiconductor switching element, can be formed by a transistor, in particular a field effect transistor, preferably a metal oxide field effect transistor (MOSFET), an insulated gate bipolar transistor (IGBT), but also by a gate turn-off thyristor (GTO) and/or the like or any other type of switching elements. These switching elements are preferably arranged integrated into the respective battery cells.

The control unit is connected at least to the switching elements, in particular the semiconductor switching elements of the battery cells. For this purpose, the battery cell can have a respective communication interface via which it has a communication connection to the control unit. The communication interfaces can, for example, be wired and/or also wireless. A wireless communication link can be based on radio, in particular short-range radio, for example. Each of the battery cells preferably has its own communication interface, by means of which it has a communication connection to the control unit. In particular, the communication interface on the battery cell side can be connected to a respective integrated part of a battery cell controller, which in turn is connected at least to the semiconductor switching elements in order to control them in a predeterminable manner with respect to their switching state. As a result, activation or deactivation of the respective battery cell and also polarity of its respective galvanic cell can be controlled by means of the control unit.

The control unit itself can be provided as a separate structural unit. However, it is preferably part of the battery and particularly preferably arranged integrated into it.

In particular with regard to the second aspect, in an alternative design, it can of course also be provided that the galvanic cell is not connected to the first and the second cell connection but instead to the third and the fourth cell connection, without the advantages and effects changing, as a person skilled in the art easily recognizes. In particular with respect to the second aspect, the first of the two switching elements or semiconductor switching elements can be arranged as bridging switching elements between the negative pole of one battery cell and the positive pole of the subsequent battery cell. The second switching element or semiconductor switching element can be located complementary to this between the positive pole of one and the negative pole of the subsequent cell.

These additional bridging switching elements enable an individual battery cell to be bridged, for example in the event of a fault or defect, independently of whether a positive or a negative output voltage is to be provided. As a result, for example, the possibility of a series circuit of battery cells having only an odd or even number and thus a deactivation of the intervening battery cells is provided. Overall, any series combination of desired battery cells can be implemented.

One advantage of the proposed topology using bridging switching elements according to the second aspect is in particular that when bypassing a single battery cell is desired or necessary, two successive battery cells do not have to be deactivated from the overall system, but rather only the respective battery cell itself can be removed from the voltage generation.

In spite of the additional switching elements, the proposed topology, in particular according to the second aspect, is also distinguished above all by the fact that it allows both positive and negative output voltages to be generated. No additional components are thus required to commutate the voltage.

Rather, the additional bridging switching elements promote voltage generation in that they make the selection of specific battery cells for the overall output voltage significantly more flexible.

Using the additional bridging switching elements, for example, an increased number of switching combinations is also possible. For example, with the proposed topology, a switching combination for implementing the cascading of two even-numbered or odd-numbered battery cells is possible. Modulation methods such as the charge balance control method may thus also be used.

Another advantage, in particular according to the second aspect, accompanying the proposed topology is the ability not only to connect any number of battery cells to one another in series—depending on the required voltage swing or the like—but also to connect battery cells in parallel. Almost any configuration can be implemented here. In addition to solely a parallel circuit of all battery cells of an individual strand, variants can also be implemented in which only a defined number of battery cells can be combined with one another in parallel and this group can be connected in series to other battery cells of the same phase strand. This means that all possible combinations of battery cells connected in parallel and/or in series, in particular of a phase strand, can be implemented, for example cascading of xsyp modules, wherein s stands for serial and p stands for parallel and x and y denote the respective number of cells.

The accompanying advantage of this new degree of freedom can include, inter alia, the lower current loading of the individual battery cells. If voltage sources are not required for generating the output voltage for certain times, these can be switched in parallel to voltage sources that actively contribute to the output voltage value, whereby the strand current can be uniformly divided between the cells of the parallel group. This can reduce the current loading of the individual battery cells. As a result, minimized losses, for example conduction and/or switching losses, can also result. Because the individual battery cells can be parallelized, the internal resistance of these can also be reduced to a fraction, depending on the number of battery cells connected in parallel.

The proposed topology, in particular according to the second aspect, can also provide the property that each pole of a preceding battery cell is connected to both poles of the following battery cell. This enables the functionality of the overall circuit to be retained, regardless of the polarity with which the battery cells are installed. If the installation direction is determined, for example, by a voltage measurement, the activation of the overall battery can be adaptively adjusted during operation. This can, for example, offer advantages in a concept with exchangeable cells. The assembly of the battery cells can thus be protected against polarity reversal.

The proposed topology, in particular according to the second aspect, can be expanded to include any number of battery cells n and phase strands m connected in parallel thereto. A system of n×m battery cells thus results, wherein n battery cells can be located within a phase strand of m parallel strands which, for example, generate an m-phase output voltage.

Each of the battery cells preferably has its own cell housing in which the first and second semiconductor switching elements are arranged and which has at least one connection contact for each of the cell connections, wherein the connection contacts are arranged electrically isolated from one another. As a result, a modular construction of the battery can be achieved in a simple manner, which allows the battery to be adapted in a simple manner for specific applications. In addition, an individually manageable structural unit can be created by means of the cell housing, which not only facilitates the production of the battery, but also enables the basic function of a respective battery cell to be checked before the battery is produced. This enables the battery to be produced more reliably. The cell housing can also provide at least one communication interface which allows the semiconductor switching elements to be operated in the intended switching mode in order to be able to provide the predeterminable electrical voltage. The cell housing can have at least one printed circuit board on which at least the semiconductor switching elements are arranged.

The cell housing can comprise a receptacle frame, a receptacle cup, and/or the like made of a suitable material, in which or on which at least some of the corresponding elements and/or units of the battery cell are arranged. The material can, for example, include plastic and/or metal.

The galvanic cell is preferably also arranged in or on the cell housing. The cell housing can preferably at least partially accommodate or encompass the galvanic cell. The cell housing can, for example, have one or more connection contacts for electrically contacting the potential connections of the galvanic cell. The at least one connection contact can be provided, for example, by the above-mentioned printed circuit board. The at least one connection contact is preferably designed in accordance with the at least one potential connection of the galvanic cell in order to achieve a reliable and permanent electrical connection to it in normal operation. The galvanic cell can furthermore be arranged integrated with at least some of the further elements and/or units in or on the cell housing.

To connect the galvanic cell to the cell housing, mechanical and/or electrical connection means can be provided, such as one or more screw connections, one or more clip and/or plug connections, one or more adhesive, solder, and/or weld bonds, combinations thereof or the like. Both a mechanical connection and an electrical connection can preferably be achieved using the connecting means. However, it can also be provided that the galvanic cell in the state connected to the cell housing or arranged on the cell housing is pressed with at least one of its potential connections against a corresponding connection contact, for example due to a spring force or the like. In addition, this design enables the galvanic cells to be produced separately from the battery cells. This enables the galvanic cells to be produced at different manufacturing locations, in particular also by different producers. These can then be arranged in or on the cell housing in a separate manufacturing step.

It can furthermore be provided that the galvanic cell is detachably arranged on or in the cell housing. It is thus possible to separate the galvanic cell from the further elements and/or units of the battery cell both spatially and electrically. This makes it possible, for example, to replace the galvanic cell if necessary. The detachable connection can be formed, for example, by one or more screw connections, one or more clip and/or plug connections, and/or the like.

In addition, it can be provided that at least the first and the second semiconductor switching element are arranged in a housing, wherein the housing has at least one connection contact for each of the cell connections, wherein the connection contacts are arranged electrically isolated from one another and the housing has further connections for connecting the galvanic cell. In this design, the galvanic cell does not need to be encompassed by the housing. It can for example be arranged externally. In addition, the galvanic cell can also be replaceably arranged on or in the housing. In particular, the galvanic cell can be arranged detachably. The number of connections preferably corresponds to the number of potential connections of the galvanic cell.

In particular with regard to the second aspect, the battery cell can have a circuit structure in which a first semiconductor switching element is connected between the first and the third cell connection, a second semiconductor switching element is connected between the second and the fourth cell connection, a third semiconductor switching element is connected between the first and the fourth cell connection, and a fourth semiconductor switching element is connected between the second and the third cell connection. With regard to the advantages and effects, reference is made to the above statements, in particular with respect to the first aspect.

The battery modules can also preferably have four module connections. As a result, the battery modules can be formed in a simple manner from the battery cells according to the invention. In this case, the battery cells can be electrically coupled to one another at least partially in a series circuit, particularly with respect to the second aspect.

In principle, the battery modules of a battery according to the invention can be at least partially connected in parallel or also connected in series. A combination of these can also be at least partially provided.

The control unit preferably controls the semiconductor switching elements in such a way that the desired electrical voltage is provided at the battery terminals. If not all of the battery cells of the series circuit are required to provide the predetermined electrical voltage, the control unit can provide that, if necessary, different battery cells arranged in the series circuit are deactivated in order to ensure that the loading is as uniform as possible overall on average, for example with respect to different aspects such as SoC, temperature, SoH, and/or the like of the battery cells. Balancing with respect to the battery cells with regard to their state-of-charge value (SOC), but also parameters such as temperature, state-of-health (SOH), and/or the like of the respective series circuit can thus be achieved. However, this does not exclude the possibility that the battery cells have different, in particular chemical, properties. Greatly varying types of battery cells can be operated together by means of the present concept.

With respect to the battery according to the invention, it is proposed in particular that at least one battery cell is connected in parallel to one of the battery cells connected in series, in that their respective cell connections are electrically connected to one another. With respect to the parallel connection of two individual battery cells, this means that the respective first, second, third, and fourth electrical cell connections are connected to one another. If the battery cells are to be operated in parallel operation, it can additionally be provided that their respective semiconductor switching elements are accordingly operated together in switching operation.

In order to be able to electrically connect a respective series circuit to the respectively associated battery terminals, it can be provided that the second and fourth cell connections of one of the respective end battery cells form one end of the series circuit by connecting these cell connections in parallel to one of the associated battery terminals. In the case of the battery cell arranged at the opposite end of the series circuit, the first and third cell connections can be connected to a switching unit which comprises two semiconductor switching elements, in which a respective first of their connections is electrically connected to the other of the two battery terminals associated with the series circuit, wherein their respective opposing second connections are connected to the respective first and third cell connections of this battery cell. As a result, the series circuit can be fully utilized in the desired manner with regard to its functionality.

It is furthermore proposed that a corresponding number of further battery cells connected in series be connected in parallel to a predetermined number of battery cells connected directly in series in the series circuit by electrically connecting the cell connections of further battery cells arranged at the end to the corresponding cell connections at the end of the number of the battery cells connected directly in series. In the case of the battery cell at the end, in which the second and fourth cell connections form the end of the further parallel circuit, the second and fourth cell connections are preferably connected in parallel, wherein the second semiconductor switching element of this battery cell remains in the switched-off state. This makes it possible, in particular when providing electrical voltages lower than the maximum electrical voltage that can be provided by the series circuit, to provide an additional electrical capacitance in a simple manner, so that a lower electrical voltage can be electrically claimed to a greater or also more frequent extent. The flexibility with regard to the battery can be further increased.

It is also proposed that the battery has at least two independently operable series circuits made up of the battery cells and at least one further battery terminal, wherein at least one end of the series circuit is individually connected to a respective one of the battery terminals, preferably via a switching unit, in order to operate the semiconductor switching elements of the battery cells of the respective series circuits independently of the semiconductor switching elements of the battery cells of the respective other series circuit, but depending on an electrical voltage individually predeterminable for the respective series circuit. This makes it possible in a simple manner to be able to provide multiple phases, in particular with respect to AC voltages. However, it can also be provided that DC voltages that are independent of one another can be provided, or also combinations thereof.

The respective semiconductor elements can keep their open or closed state constant over time.

With respect to the method, it is furthermore proposed that an AC voltage be predetermined as the predetermined electrical voltage. As a result, the battery can also be used as an inverter at the same time, which saves corresponding expenditure.

It is furthermore proposed that the semiconductor switching elements of the battery cells are operated in normal operation to provide the predetermined electrical voltage in such a way that the galvanic cells of the battery cells are loaded uniformly. The uniform loading is preferably provided on average over time. For this purpose, it can be provided that the control unit selects battery cells that are not required to provide the predetermined electrical voltage, for example cyclically, so that the loading on average over time is preferably essentially the same for all battery cells with regard to their SOC value, but also parameters such as temperature and SOH values etc. of the series circuit. This proves to be particularly advantageous when an AC voltage is provided, wherein different battery cells of the series circuits can be activated cyclically to provide low voltage values of the AC voltage. In this way, a balancing with respect to the battery cells of the respective series circuit can be achieved. However, this does not exclude the possibility that the cells have different, in particular chemical, properties. Greatly varying types of cells can be operated together by means of the present concept.

Basically, the method control according to the invention can be used not only to provide an electrical voltage and to provide electrical energy, but it can also be used to charge the battery by supplying it with electrical energy. The application is therefore not limited to delivering electrical energy by way of the battery, rather it can also be used to absorb energy and to store the electrical energy.

The advantages and effects specified for the battery cell according to the invention, the battery according to the invention, the battery module according to the invention, the motor vehicle according to the invention, and the method according to the invention apply equally to all aspects of the invention and vice versa. In particular, device features can therefore also be formulated as method features and vice versa.

The invention also includes further developments of the method according to the invention, which have characteristics as already described in the context of the refinements of the motor vehicle according to the invention. For this reason, the corresponding refinements of the method according to the invention are not described again here.

The motor vehicle according to the invention is preferably designed as an automobile, in particular as a passenger car or truck, or as a passenger bus or motorcycle.

The invention also comprises the combinations of the features of the described embodiments.

BRIEF DESCRIPTION OF THE FIGURES

Exemplary embodiments of the invention are described hereinafter. In the figures.

DETAILED DESCRIPTION

Figure 1:
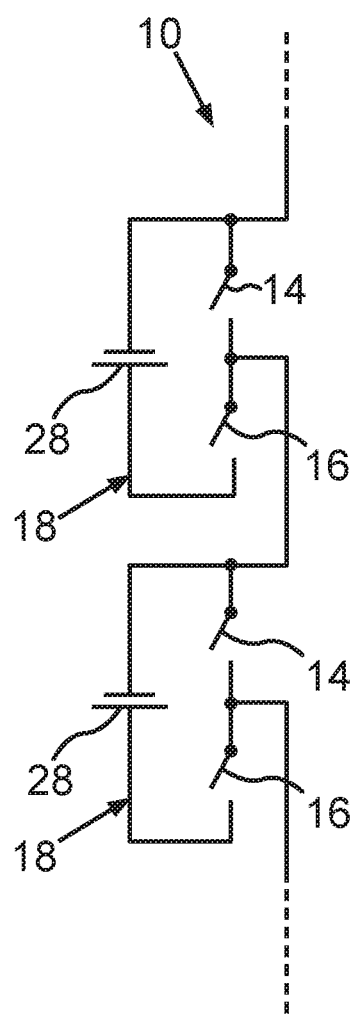
FIG. 1 shows a schematic circuit diagram representation of two converter modules connected in series of a multilevel power converter (not shown in greater detail) in a half-bridge circuit.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is intended to include combinations of the features of the embodiments other than those shown. Furthermore, the described embodiments can also be supplemented by further features of the invention that have already been described.

In the figures, the same reference numerals designate elements that have the same function.

FIG. 1 shows, in a schematic circuit diagram representation, a detail from a multilevel energy converter 10 having converter modules 18 connected in series, wherein the converter modules 18 are designed in a half-bridge circuit. Each converter module 18 accordingly comprises a series circuit made up of two semiconductor switching elements 14, 16, to which a battery cell 28 is connected in parallel as a converter module capacitor. A center tap of the series-connected semiconductor switching elements 14 and a connection of the battery cell 28 form module connections of the converter module 18.

Figure 2:
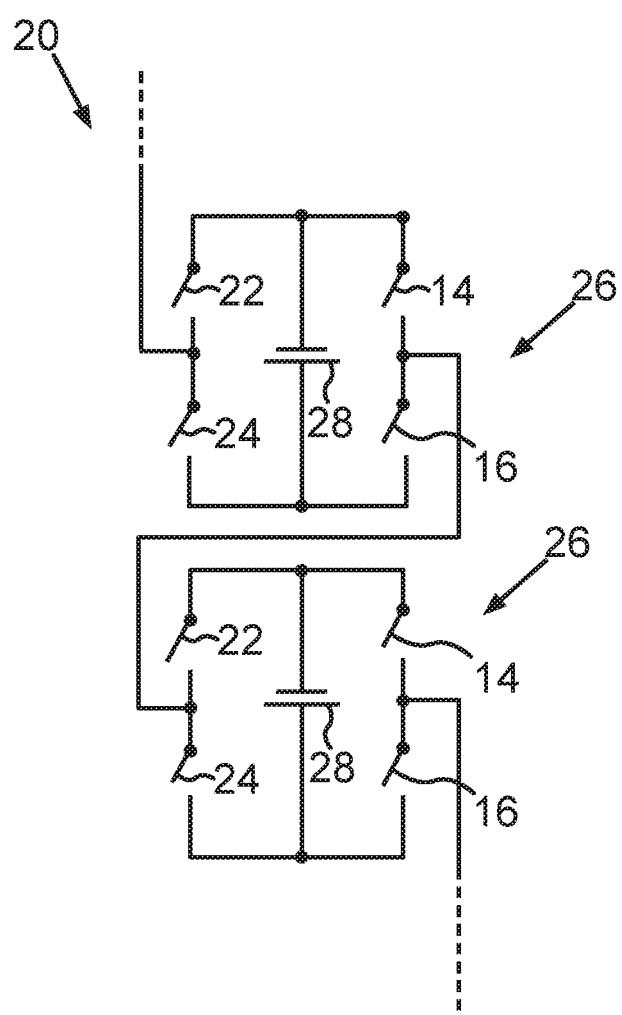
FIG. 2 shows a schematic circuit diagram representation like FIG. 1, wherein the transducer modules are configured here in a full-bridge circuit.

FIG. 2 shows a further design of a multilevel energy converter 20 having converter modules 26, wherein the multilevel energy converter 20 differs from the multilevel energy converter 10 by way of the circuit structure of the converter modules 26. The converter modules 26 have a second series circuit made up of semiconductor switching elements 22, 24, which is additionally connected in parallel to the battery cell 28 and thus also to the series circuit made up of the semiconductor switching elements 14, 16. The converter module 26 has the center taps of the series circuits of the semiconductor switching elements 14, 16, 22, 24 as connections.

The function of the multilevel energy converters 10, 20 is known in the prior art and is explained, for example, in DE 10 2015 205 267 A1 and using a converter module capacitor designed as an electrical capacitor.

Figure 3:
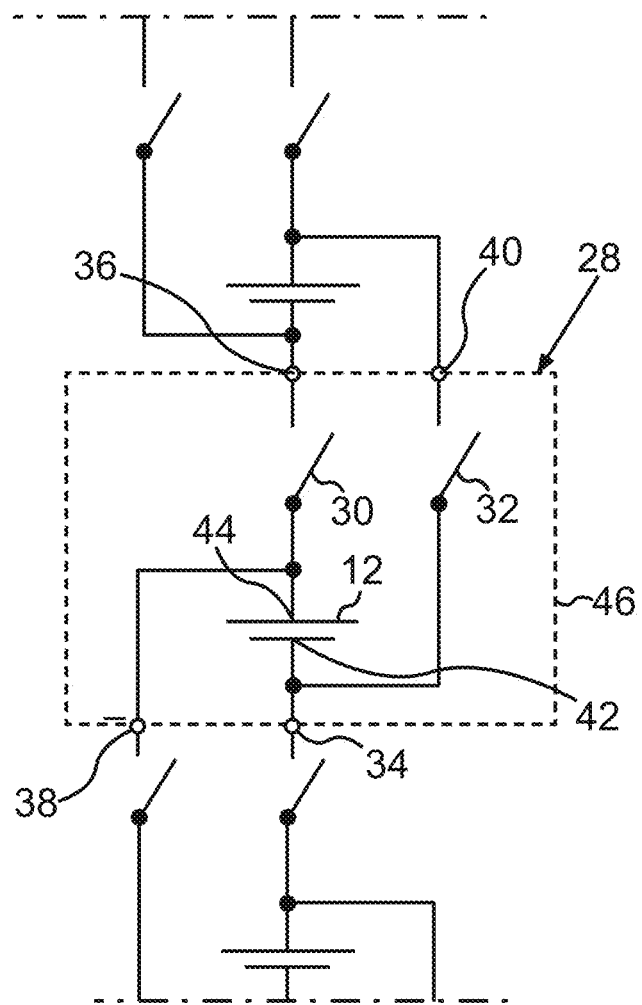
FIG. 3 shows a schematic circuit diagram representation of a battery cell according to a first aspect of the invention.
Figure 4:
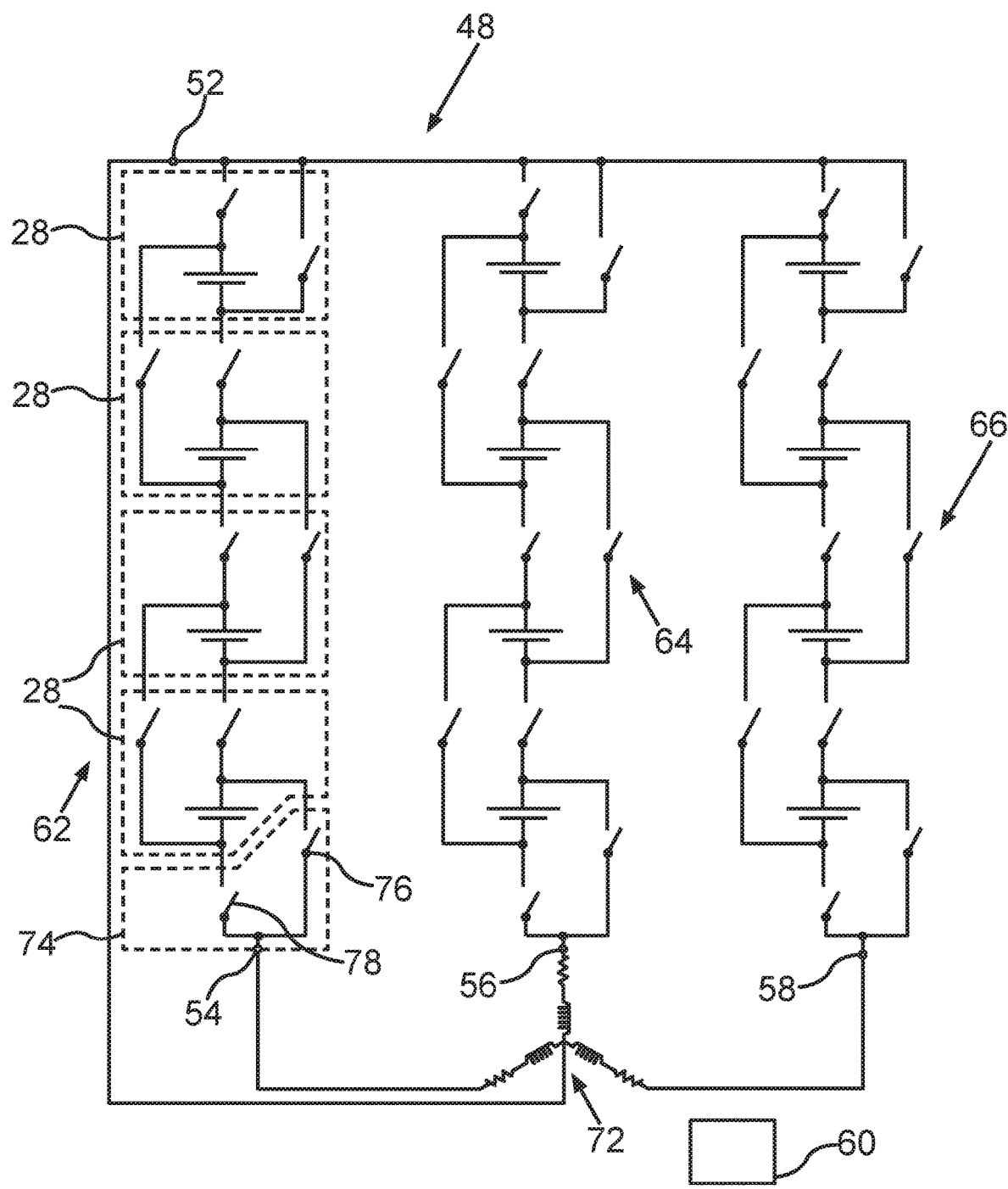
FIG. 4 shows a schematic circuit diagram representation of a battery according to the first aspect of the invention having battery cells as shown in FIG. 3, which are connected to form three phases in three series circuits, to which a three-phase asynchronous machine is connected.
Figure 5:
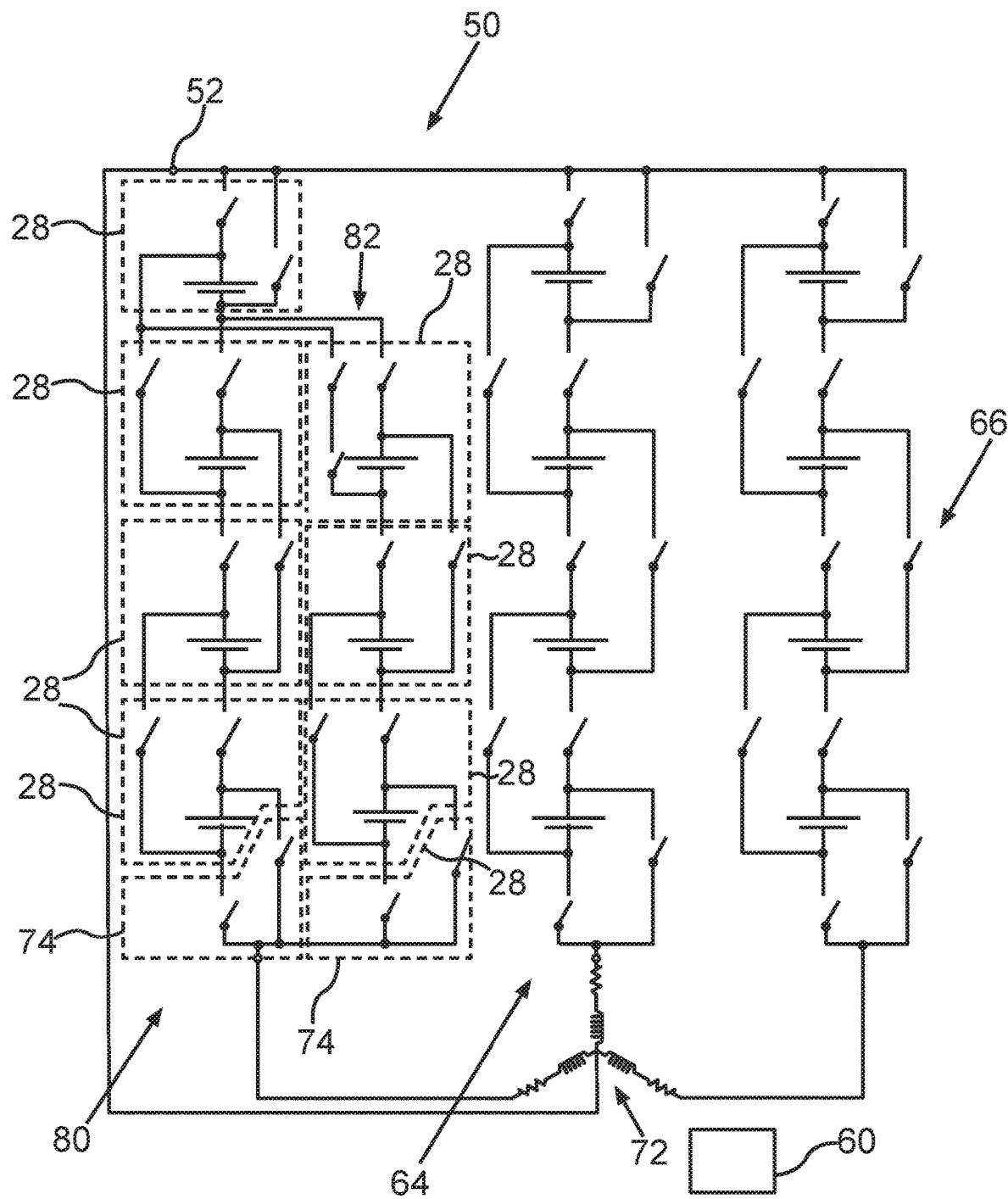
FIG. 5 shows a schematic illustration like FIG. 4, wherein the first series circuit includes a parallel-connected second series circuit made up of battery cells of the invention.

FIG. 3 shows, in a schematic circuit diagram, a battery cell 28 having a galvanic cell 12. The battery cell 28 is used as an element for the modular construction of a battery 48, 50 (FIGS. 4, 5). The galvanic cell 12 is designed as an electrochemical cell and has two electrodes which form a first potential connection 42 and a second potential connection 44. In the present design, the galvanic cell 12 is designed as a lithium-ion cell. In alternative designs, another galvanic cell can also be provided here, for example a lead-acid cell or the like.

The battery cell 28 has a first cell connection 34 which is electrically coupled directly to the first potential connection 42 of the galvanic cell 12. Furthermore, the battery cell 28 has a second cell connection 36, which is electrically coupled to a second potential connection 44 of the galvanic cell 12 via a first semiconductor switching element 30 of the battery cell 28. The first semiconductor switching element 30 is formed in the present case by a transistor, namely a field effect transistor in the manner of a MOSFET. Alternatively, another transistor, for example an IGBT or the like, can of course also be used here.

The battery cell 28 furthermore comprises a third cell connection 38 electrically coupled to the second potential connection 44 of the galvanic cell 12, a second semiconductor switching element 32, which can be designed essentially like the first semiconductor switching element 30, and a fourth cell connection 40, which is electrically coupled via the second semiconductor switching element 32 to the first potential terminal 42 of the galvanic cell 12. In contrast to the prior art, the battery cell 28 thus has four cell connections 34, 36, 38, 40 in the present case. As will be explained below, this specific circuit structure of the battery cell 28 enables specific functionalities to be achieved when operating a battery 48, 50 constructed using the battery cells 28.

FIG. 4 shows, in a schematic circuit diagram representation, a battery 48 which comprises a plurality of battery cells 28, as explained according to FIG. 3. The battery 48 comprises battery terminals 52, 54, 56, 58, to which a three-phase asynchronous machine 72 is directly connected. In the present case, the asynchronous machine 72 is designed as a three-phase electrical machine in a star circuit. A star point (not designated) of the asynchronous machine 72 is connected to the battery terminal 52. The respective phase connections of the asynchronous machine 72 are connected to the battery connections 54, 56, 58. Basically, a delta circuit can of course also be provided instead of the star circuit.

It can be seen from FIG. 4 that the battery cells 28 are connected to form three series circuits 62, 64, 66. A respective one of the series circuits 62, 64, 66 is connected to the battery terminal 52 via one of the battery cells 28 arranged at the end, namely their second and fourth cell connection 36, 40, which provides one end of the respective series circuits 62, 64, 66. The battery cells 28 arranged at the opposite ends of the series circuits 62, 64, 66 are connected to the respective associated battery terminal 54, 56, 58 via respective switching units 74. The series circuits 62, 64, 66 are formed essentially identically in the present case.

The switching units 74 comprise respective semiconductor switching elements 76, 78, which in the present case can be designed like the switching elements 30, 32. With one of their connections, the semiconductor switching elements 76, 78 are connected directly to the corresponding one of the battery terminals 54, 56, 58. The opposite connections of the semiconductor switching elements 76, 78 are electrically connected to the respective first and third connections 34, 38 of the respective battery cells 28 at the end.

This circuit structure makes it possible for each of the series circuits 62, 64, 66 to be able to provide an individual electrical voltage, which in the present case is an AC voltage. The AC voltages that are provided by the series circuits 62, 64, 66 are phase shifted by 120 degrees in the present case in order to provide a three-phase AC voltage for the asynchronous machine 72.

The battery 48 further comprises a control unit 60 to which the switching elements 30, 32 of the battery cells 28 and the switching elements 76, 78 of the switching units 74 are connected. By appropriately switching the switching elements, battery cells 28 can be activated or deactivated in order to be able to provide an AC voltage to be provided according to a respective predetermined electrical AC voltage at the battery terminals 54, 56, 58 in relation to the battery terminal 52. This makes it possible for the battery 48 to simultaneously provide the functionality of a present three-phase inverter, so that a separate inverter for operating the asynchronous machine 72 can be saved.

With the circuit structure according to the invention, it is possible to provide both positive and negative electrical potentials with respect to the battery terminal 52, which in the present case is used as an electrical reference potential. In addition, it is possible, if necessary, to vary amplitudes and/or also phase shifts between the electrical voltages provided by the series circuits 62, 64, 66, if this is desired in normal operation of the asynchronous machine 72.

Although only a motor mode of the asynchronous machine 72 is described here, a corresponding functionality is also possible in the generator mode of asynchronous machine 72. This is not important in the present case for the functionality of the battery 48 according to the invention.

In addition, the control unit 60 is also designed in the present case to deactivate respective battery cells 28 when providing voltage values that are less than the maximum possible amplitude of a respective one of the series circuits 62, 64, 66. If necessary, different ones of the battery cells 28 can be deactivated in order to achieve the most uniform possible loading of the battery cells 28 of a respective one of the series circuits 62, 64, 66. In addition, this can also be used for balancing between the battery cells 28 of a respective one of the series circuits 62, 64, 66.

FIG. 5 shows, in a schematic circuit diagram representation like FIG. 4, a battery 50 instead of the battery 48, which differs from the battery 48 in that the series circuit 62 is replaced by the series circuit 80. The series circuits 64 and 66 correspond to those of the battery 48, for which reason reference is made in this regard to the preceding statements. The function of the battery 50 as a whole is also based on the preceding explanations.

The series circuit 80 differs from the series circuit 62 in that a further series circuit 82 is connected in parallel to a part of the battery cells 28 of the series circuit 62. The series circuit 82 also has a switching unit 74 to which—as in the series circuit 62—battery cells 28 are connected in series. The battery cell 28 at the end, which is opposite to the switching unit 74 in the series circuit 82, is connected using its second cell connection 36 to the fourth cell connection 40 of the battery cells 28 to be connected correspondingly in parallel. Accordingly, the semiconductor switching element 30 of this battery cell 28 is in the switched-on state, whereas the switching state of the semiconductor switching element 32 is in the switched-off switching state. Basically, however, this does not matter for the second semiconductor switching element 32, namely because the fourth cell connection 40 of this battery cell is not connected, that is to say it remains open. Due to this circuit structure, the series circuit 80 has a greater electrical capacitance available when small voltages are provided. Basically, this can also be provided for the further series circuits 64, 66. The number of the parallel-connected battery cells 28 can vary. In addition, the number of the battery cells 28 connected in series can also be varied as required.

It emerges from the above statements that the battery 48, 50 can be formed in a modular manner using the battery cells 28, so that it can be easily adapted to specific applications. At the same time, the invention enables very different voltages to be provided by the battery 48, 50 in a highly flexible manner. The voltages that can be provided by the battery 48, 50 can be independent of one another. A multitude of different voltages can be provided as required.

Overall, the battery cells 28 are arranged such that, depending on the activation of the individual semiconductor switching elements 30, 32, both positive and negative output voltages can be generated. For this purpose, for example, a positive pole of a battery cell 28 is connected to a negative pole of a preceding battery cell 28 within one of the series circuits 62, 64, 66. In addition, there is another semiconductor switching element between the negative pole of this battery cell 28 and its following battery cell 28.

As a result, all of the battery cells 28 in a respective one of the series circuits 62, 64, 66 are connected to one another in series via the semiconductor switching element 30, that is to say there is a switching element between the positive pole of one of the battery cells 28 and the negative pole of another following battery cell 28. Each of the battery cells 28 is additionally connected via a switch from its negative pole to the positive poles of its "strand predecessor" and its "strand follower" of the battery cell 28. A base unit is formed in this way.

This base unit can be expanded by any number of battery cells 28, so that a strand of battery cells is created which can be used to generate an output voltage, for example a phase of an AC voltage.

The galvanic cells 12 of the base unit or battery cell 28 shown in addition to the use individually in a battery cell 28 (FIG. 3), can be implemented by a group of cells connected in series and/or in parallel, so that a simulation of voltage swings can be provided flexibly depending on the application.

Just as many such strands can be connected in parallel to a predetermined number of battery cells 28, so that a predetermined topology for outputting a multiphase AC voltage can be implemented.

The circuit structure is thus expandable to a matrix circuit made up of battery cells 28 connected in series and in parallel. In addition, any parallel strands can be incorporated within individual phase strands and multiple strands can be used to form a single phase.

Figure 6:
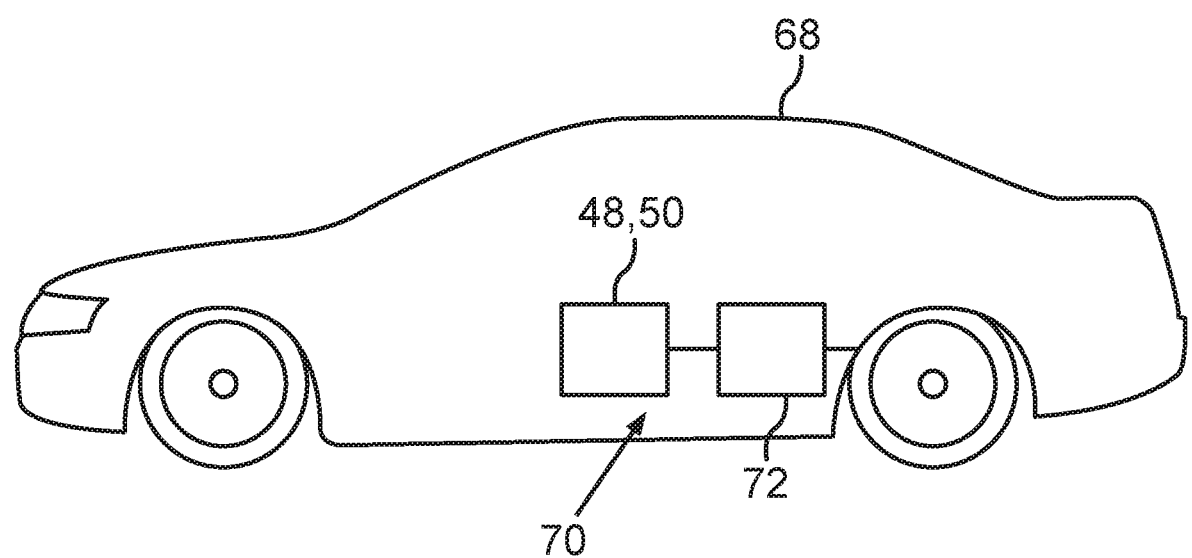
FIG. 6 shows a schematic illustration of a motor vehicle having a vehicle electrical system, to which an electric asynchronous motor is connected as a drive device, and a battery according to FIG. 4, to which the asynchronous machine is connected.

FIG. 6 shows a schematic side view of an electrically drivable motor vehicle 68 which comprises a vehicle electrical system 70. The vehicle electrical system 70 has the asynchronous machine 72 as the drive device and the battery 48, 50. The battery 48, 50 is designed either according to FIG. 4 or according to FIG. 5 and the asynchronous machine 72 is directly connected to the battery 48, 50. A separate inverter is thus not required for normal operation of the asynchronous machine 72, because the battery 48, 50 directly provides the three-phase AC voltage for the asynchronous machine 72.

Figure 7:
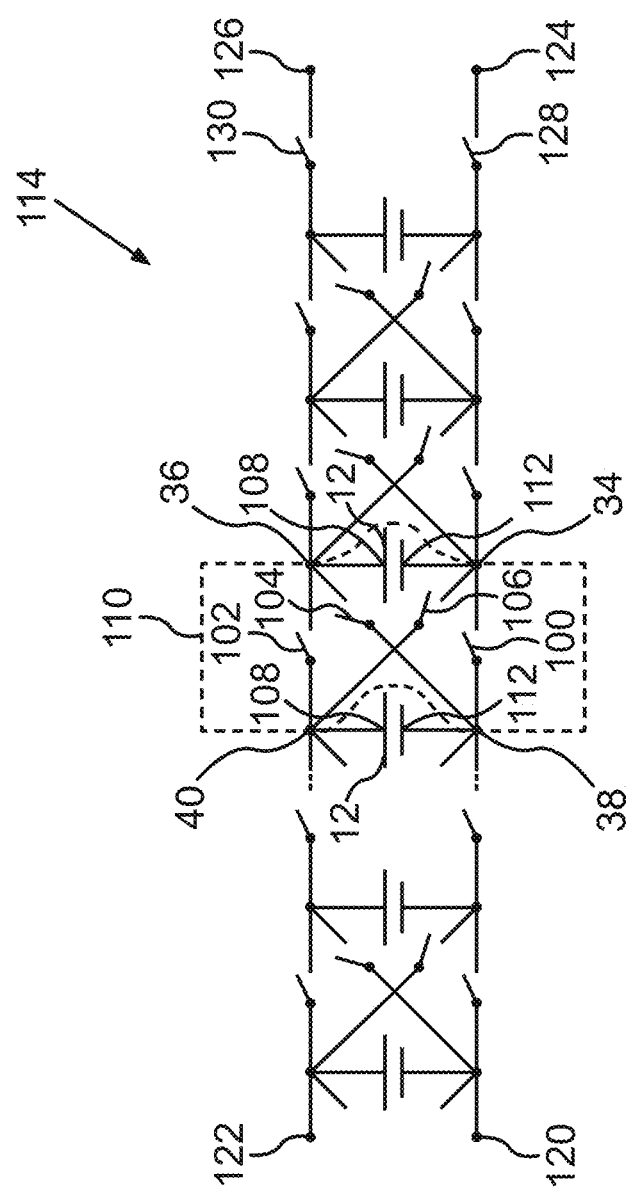
FIG. 7 shows a schematic circuit diagram representation of a battery module having battery cells connected in series according to a second aspect.

FIG. 7 shows, in a schematic circuit diagram representation, a battery module 114 having battery cells 110 according to a second aspect. Each of the battery cells 110 has a galvanic cell 12, as has already been explained with reference to FIG. 3. In this regard, reference is made to the corresponding statements above. The galvanic cell 12 has a first electrode connection 112 and a second electrode connection 108. A first cell connection 34 is connected to the first electrode connection 112 and a second cell connection 36 is connected to the second electrode connection 108. With regard to the cell connections, reference is also made to the corresponding descriptions above.

The battery cell 110 furthermore comprises a third and a fourth cell connection 38, 40 and four semiconductor switching elements 100, 102, 104, 106, by means of which the electrode connections 108, 112, depending on a respective switching state of the semiconductor switching elements 100, 102, 104, 106 can each be electrically coupled to the third or the fourth cell connection 38, 40. For this purpose, the present embodiment provides that a first semiconductor switching element 100 is connected between the first and the third cell connection 34, 38, a second semiconductor switching element 102 is connected between the second and the fourth cell connection 36, 40, a third semiconductor switching element 104 is connected between the first and the fourth cell connection 34, 40, and a fourth semiconductor switching element 106 is connected between the second and the third cell connection 36, 38. This circuit structure creates the possibility of connecting the individual battery cells 110 in parallel or in series, for example in dependence on a desired number of active battery cells or on an output voltage level to be provided.

From FIG. 7 it can also be seen that the battery cells 110 are connected in series in the present case in that the cell connections 34, 36 of a respective one of the battery cells 110 are each electrically connected to the corresponding cell connections 38, 40 of an upstream one of the battery cells 110. The battery cells 110 in the present case have four cell connections—contrary to the prior art. This means that the battery module 114—as can be seen from FIG. 7—also has four module connections, namely the module connections 120, 122, 124, 126. The module connections 120, 122 are formed in the present case by corresponding cell connections of one of the two battery cells 110 at the ends. In contrast, the module connections 124, 126 are electrically coupled to the corresponding cell connections of an opposite one of the battery modules 110 at the end via respective associated switching elements 128, 130.

Figure 8:
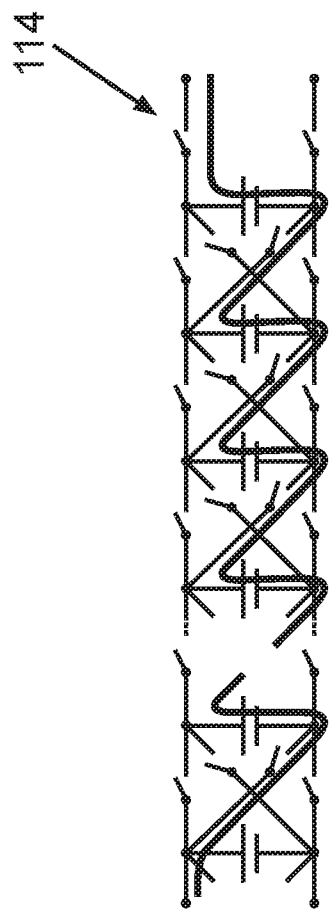
FIG. 8 shows a schematic circuit diagram representation like FIG. 7, which different operating states of the battery module according to FIG. 7 are shown.
Figure 9:
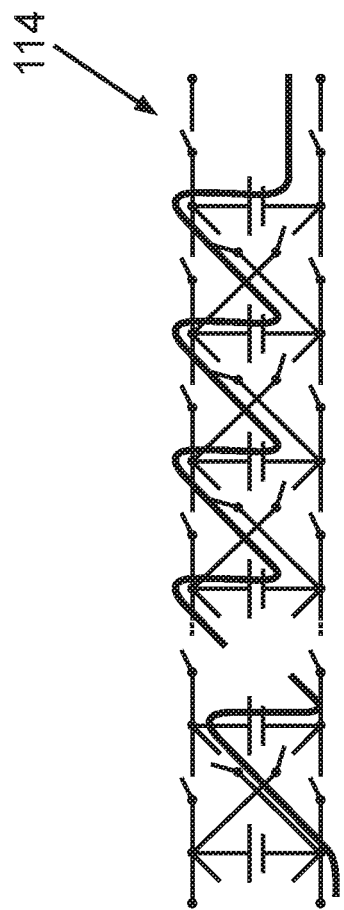
FIG. 9 shows a schematic circuit diagram representation like FIG. 7, which different operating states of the battery module according to FIG. 7 are shown.
Figure 12:
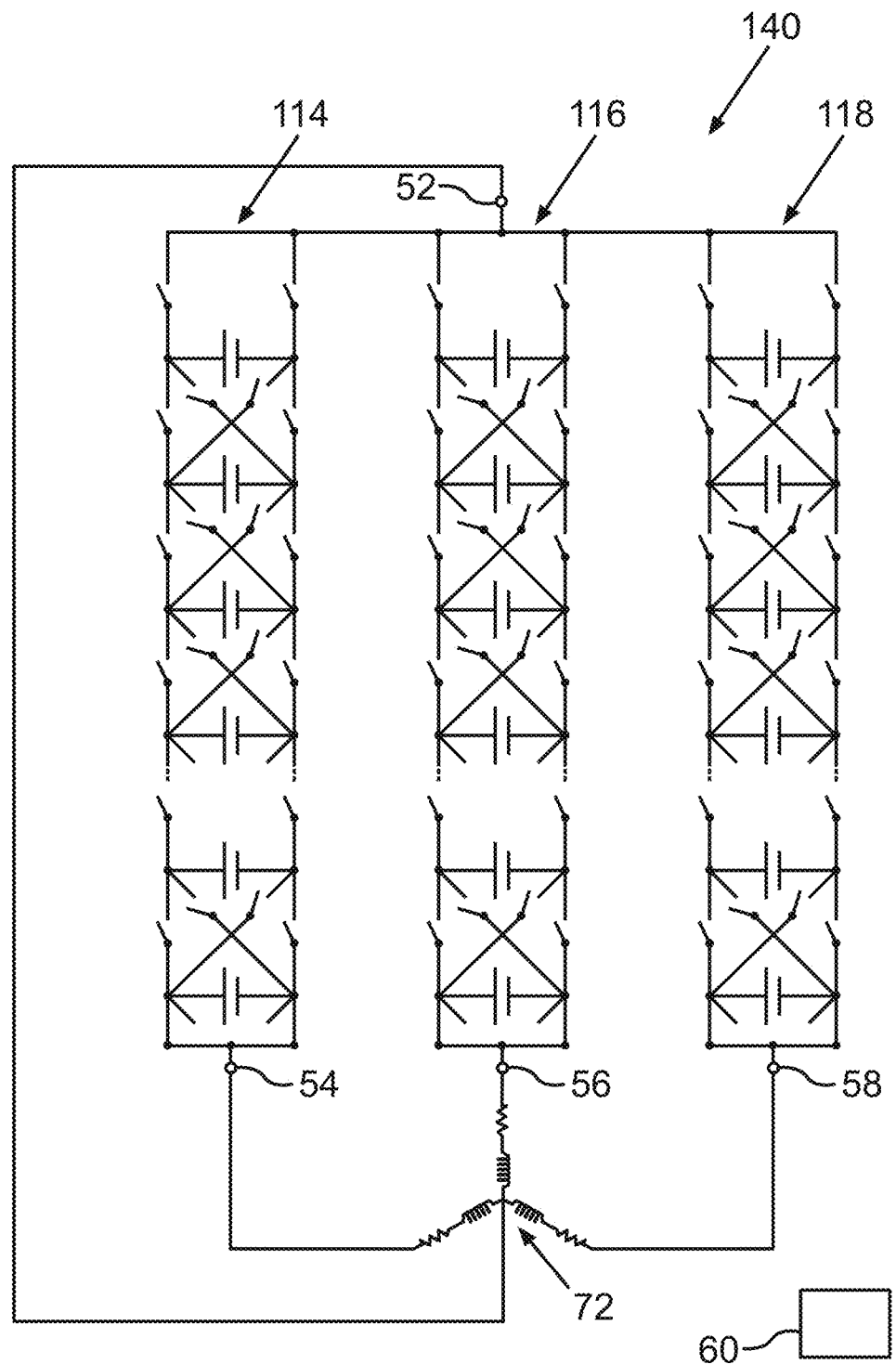
FIG. 12 shows a schematic circuit diagram representation of a battery having three battery modules according to FIG. 7 for providing a three-phase AC voltage, wherein an asynchronous machine is directly connected to the battery.

FIG. 8 shows, in a schematic circuit diagram representation, like FIG. 7, an operating state of the battery module 114 in which all of the battery cells 110 connected in series are activated. This series circuit is useful, for example, when a corresponding positive phase voltage is to be provided using the battery 140 (FIG. 12). FIG. 9 shows a corresponding representation in a schematic circuit diagram representation like FIG. 8, but now for the provision of a corresponding negative phase voltage with respect to a star point potential of the star point.

Figure 10:
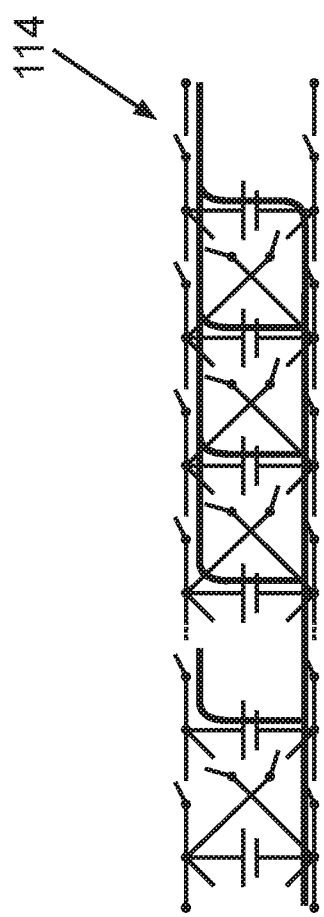
FIG. 10 shows a schematic circuit diagram representation like FIG. 7, which different operating states of the battery module according to FIG. 7 are shown.

The switching elements 100, 102 (par 1, par 2) of a respective one of the battery cells also offer the possibility of connecting the individual battery cells 110 in parallel, depending on the desired number of active battery cells or depending on the required output voltage level. FIG. 10 shows, in a schematic circuit diagram representation like FIG. 7 to FIG. 9, an operating state of the battery module 114 in which all of the battery cells 110 are connected in parallel.

In a dual way, this can also be used to provide a complementary voltage. For this purpose, instead of the semiconductor switching element 130, the semiconductor switching element 128 then only needs to be switched to the switched-on state. Accordingly, in the case of the last of the battery cells 110, the semiconductor switching element 102 is to be switched to the switched-on state instead of the semiconductor switching element 110.

Figure 11:
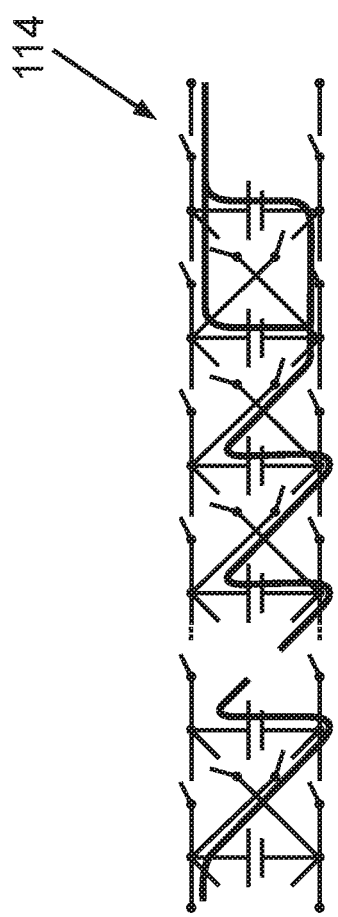
FIG. 11 shows a schematic circuit diagram representation like FIG. 7, which different operating states of the battery module according to FIG. 7 are shown.

Any combinations of the battery cells 110 can be implemented using the circuit structure of the battery module 114. It is therefore possible in particular to provide positive as well as negative output voltages. Independently of this, namely whether the battery cells are connected in series or connected in parallel, a respective one of the battery cells can be integrated into an active path, that is to say activated or deactivated, depending on the application or requirement. At the same time, a combination with a series circuit of battery cells and with a parallel connection of battery cells is of course also possible in this case. Such a use of the battery module 114 is shown, for example, in FIG. 11 in a further schematic circuit diagram representation. In the representation according to FIG. 11, the first two battery cells are electrically connected in parallel, whereas the further ones of the battery cells 110 and the first-mentioned parallel circuit are connected in series.

The battery modules 114 can now be used to form a battery 140. FIG. 12 shows, in a schematic circuit diagram representation, such a battery 140, which in the present case comprises three battery modules, namely the battery modules 114, 116, 118. The battery modules 114, 116, 118 are designed identically in the present case. However, this need not be the case for specific applications. The battery modules 114, 116, 118 of the battery 140 can of course also be designed differently from one another.

In the present case, the battery 140, like the battery 48 according to FIG. 4, is used to provide a three-phase AC voltage for an asynchronous machine 72 connected to the battery 140. In this regard, reference is additionally made to the corresponding statements above. A control device 60 to which all of the semiconductor switching elements are connected is also provided in the case of the battery 140. By means of the control device 60, the semiconductor switching elements are operated in a suitable manner in switching operation so that the desired phase voltages of the three-phase AC voltage can be provided in a suitable manner for the asynchronous machine 72.

Even if only a single strand for a respective phase voltage is provided in the battery 140 according to FIG. 12, this can of course vary in alternative designs, for example by being able to provide additional battery modules that can be operated at least partially in parallel. In addition, it can of course also be provided that battery modules having a different number of battery cells can be operated in a suitable manner in parallel operation, as has already been explained above with reference to FIG. 5.

Basically it is of course possible to combine batteries and battery modules from battery cells of the first and second aspects with one another. The first and second aspects can thus also be provided in combination with a battery and/or a battery module.

It emerges from the above statements that the battery 48, 50, 140 can be formed in a modular manner using the battery cells 28, so that it can be easily adapted to specific applications. At the same time, the invention enables very different voltages to be provided by the battery 48, 50, 140 in a highly flexible manner. The voltages that can be provided by the battery 48, 50, 140 can be independent of one another. A multitude of different voltages can be provided as required.

Overall, the battery cells 28 are arranged such that, depending on the activation of the individual semiconductor switching elements 30, 32, both positive and negative output voltages may be generated. For this purpose, for example, a positive pole of a battery cell 28 is connected to a negative pole of a preceding battery cell 28 within one of the series circuits 62, 64, 66. In addition, there is another semiconductor switching element between the negative pole of this battery cell 28 and its following battery cell 28.

As a result, all of the battery cells 28 in a respective one of the series circuits 62, 64, 66 are each connected to one another in series via the semiconductor switching element 30, that is to say there is a switching element between the positive pole of one of the battery cells 28 and the negative pole of another following battery cell 28. Each of the battery cells 28 is additionally connected via a switch from its negative pole to the positive poles of its "strand predecessor" and its "strand follower" of the battery cell 28. A base unit is formed in this way.

This base unit can be expanded by any number of battery cells 28, so that a strand of battery cells is created which can be used to generate an output voltage, for example a phase of an AC voltage.

The galvanic cells 12 of the base unit or battery cell 28 shown, in addition to the use individually in a battery cell 28 (FIG. 3), can be implemented by a group of cells connected in series and/or in parallel, so that a simulation of voltage swings can be provided flexibly depending on the application.

Just as many such strands can be connected in parallel to a predetermined number of battery cells 28, so that a predetermined topology for outputting a multiphase AC voltage can be implemented.

The circuit structure is thus expandable to a matrix circuit made up of battery cells 28 connected in series and in parallel. In addition, any parallel strands can be incorporated within individual phase strands and multiple strands can be used to form a single phase.

Figure 13:
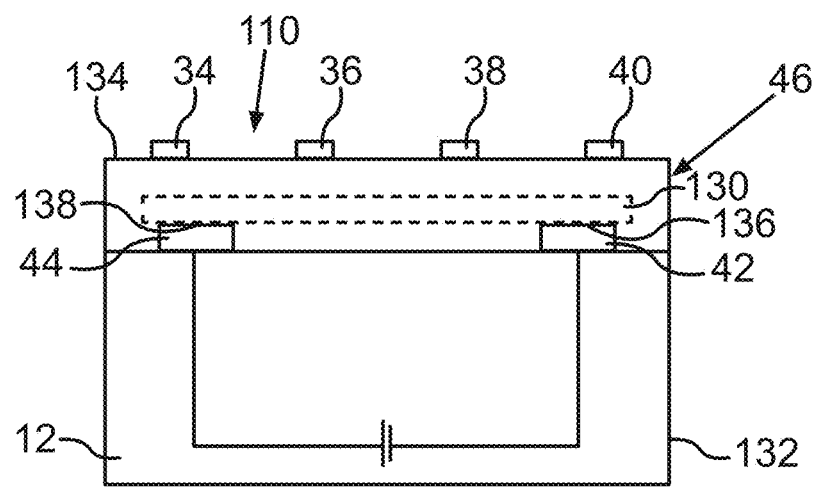
FIG. 13 shows a schematic side view of a battery cell according to FIG. 1 having a cell housing, in which a galvanic cell and a printed circuit board having semiconductor switching elements are arranged in an integrated manner.

FIG. 13 shows a schematic side view of the battery cell 110 according to FIG. 7 having a cell housing 46 in which the galvanic cell 12 and a printed circuit board 130 having the semiconductor switching elements 30, 32 are arranged in an integrated manner. The cell housing 46 comprises a housing cup 132, in the lower region of which the galvanic cell 12 is arranged. In FIG. 13, the printed circuit board 130 having the semiconductor switching elements 30, 32 is arranged in the housing cup 132 above the galvanic cell 12, wherein the semiconductor switching elements 30, 32 are not shown in this figure. The housing cup 132 is closed by means of a housing cover 134, so that the printed circuit board 130 and the galvanic cell 12 are protected from external influences.

The printed circuit board 130 provides contact surfaces 136, 138 as connection contacts for contacting the potential connections 42, 44 of the galvanic cell 12. Furthermore, the printed circuit board 130 provides further contact surfaces to which the cell connections 34, 36, 38, 40 are connected. The cell connections 34, 36, 38, 40 are arranged on the housing cover 134, so that the battery cell 110 can be electrically contacted in the intended manner.

In the present case it is provided that the potential connections 42, 44 of the galvanic cell 12 are pressed against the contact surfaces 136, 138 of the printed circuit board 130 due to a spring force in order to establish the electrical contact. In alternative configurations, another electrical connection can of course also be provided here, for example by means of a screw or plug connection or the like. In this embodiment, the galvanic cell 12 is arranged with the printed circuit board 130 integrated in the cell housing 46 of the battery cell 110.

Figure 14:
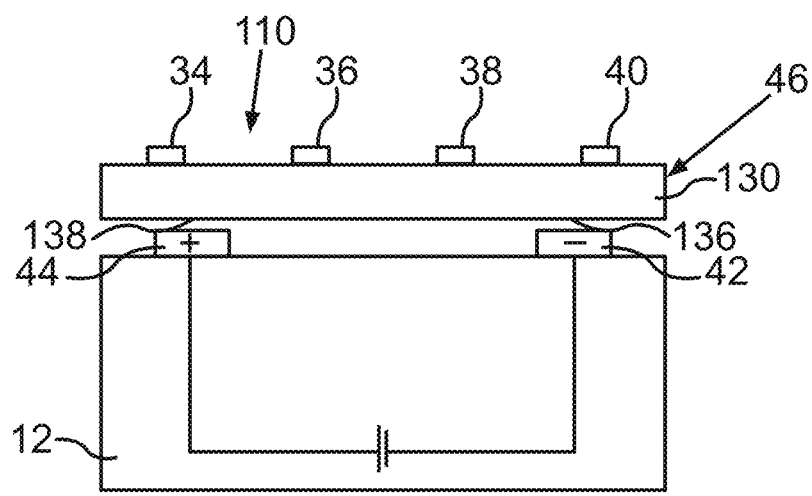
FIG. 14 shows a schematic side view of a battery cell as shown in FIG. 7, wherein the galvanic cell is arranged detachably on the cell housing.

In an alternative design to FIG. 13, FIG. 14 shows a schematic side view of a battery cell like FIG. 13, wherein the galvanic cell 12 is detachably arranged on the cell housing. In this embodiment, the cell housing is formed by the printed circuit board 130 itself. The printed circuit board 130 here thus not only provides the contact surfaces 136, 138 as connection contacts for contacting the potential connections 42, 44 of the galvanic cell 12, but also the cell connections 34, 36, 38, 40. In this design, the galvanic cell 12 can therefore be produced separately from the battery cell 110 and connected to the printed circuit board 130. This has the advantage that the production of the battery cells 110 and the galvanic cells 12 can be decoupled from one another. Basically, in an alternative design, it can of course also be provided that a cell housing is provided which comprises at least the printed circuit board 130 and provides the cell connections 34, 36, 38, 40. Furthermore, in a further alternative design, the cell housing can also provide the connection contacts for the galvanic cell 12 and fastening elements so that the galvanic cell 12 can be connected to the cell housing. For this purpose, the connection contacts can be designed, for example, as screw terminals, by means of which the potential connections 42, 44 of the galvanic cell 12 can be electrically contacted. At the same time, a mechanical connection can also be achieved in this way. In addition, a mechanical connection in the manner of a clip connection, a clamping bracket, and/or the like can also be provided. These configurations can of course also be combined with one another in almost any way. Basically, the battery cell 28 can also be designed accordingly.

The exemplary embodiments serve exclusively to explain the invention and are not intended to restrict it.

The invention claimed is:

1. A battery module having a plurality of battery cells and a control unit, each battery cell of the plurality of battery cells comprising:
   battery terminals configured to be directly connected to a three-phase asynchronous machine;
   a first cell connection electrically coupled directly to a first potential connection;
   a second cell connection electrically coupled directly to a second potential connection;
   a third cell connection electrically coupled directly to a second potential connection; and
   a fourth cell connection electrically coupled directly to a first potential connection;
   a galvanic cell, wherein the galvanic cell has electrode connections including:
   a first electrode connection and
   a second electrode connection connected to the second cell connection;
   at least four semiconductor switching elements, via which the electrode connections, depending on a respective switching state of the semiconductor switching elements, can each be electrically coupled to the third cell connection or the fourth cell connection; and
   a first semiconductor switching element connected between the first cell connection and the third cell connection, a second semiconductor switching element connected between the second cell connection and the fourth cell connection, a third semiconductor switching element connected between the first cell connection and the fourth cell connection, and a fourth semiconductor switching element connected between the second cell connection and the third cell connection;
   wherein the control unit is connected to the semiconductor switching elements; and the control unit controls the respective switching states of the semiconductor switching elements such that, based on a desired number of active battery cells or a desired output voltage level of the battery module, the battery cells are connected in series or in parallel to each other.

2. The battery module according to claim 1, the battery cell further comprising:
   a cell housing, in which at least the first and the second semiconductor switching element are arranged and which has at least one connection contact for each of the cell connections, wherein each connection contact is electrically isolated.

3. The battery module according to claim 2, wherein the galvanic cell is detachably arranged on or in the cell housing.

4. The battery module according to claim 1, further comprising four module connections for electrically coupling module connections of further battery modules and the battery terminals of a battery comprising the battery module.

5. A battery having a plurality of battery modules arranged adjacent to one another and each having at least two module connections, wherein each battery module comprises at least one battery cell, wherein the battery modules are designed according to claim 4.

6. A motor vehicle having a vehicle electrical system that comprises an electrical machine as the drive device and a battery, wherein the battery is designed according to claim 5 and the electrical machine is connected directly to the battery.

7. The battery module of claim 1, wherein:
- the first cell connection and the third cell connection are directly connected via a single semiconductor switching element, which is the first semiconductor switching element;
- the second cell connection and the fourth cell connection are directly connected via a single semiconductor switching element, which is the second semiconductor switching element;
- the first cell connection and the fourth cell connection are directly connected via a single semiconductor switching element, which is the third semiconductor switching element; and
- the second cell connection and the third cell connection are directly connected via a single semiconductor switching element, which is the fourth semiconductor switching element.

* * * * *